Nov. 11, 1958    J. M. CISNEY    2,859,944
WIRE TENSIONING AND LOCKING DEVICE
Filed July 2, 1956    2 Sheets-Sheet 1

INVENTOR.
JAMES M. CISNEY
BY M. A. Hobbs
ATTORNEY

Nov. 11, 1958             J. M. CISNEY            2,859,944
WIRE TENSIONING AND LOCKING DEVICE
Filed July 2, 1956                                     2 Sheets-Sheet 2
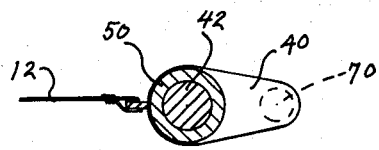
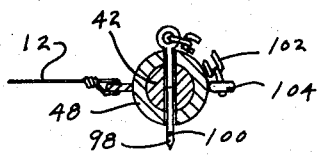
FIG. 4               FIG. 5
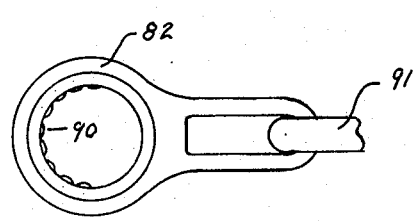
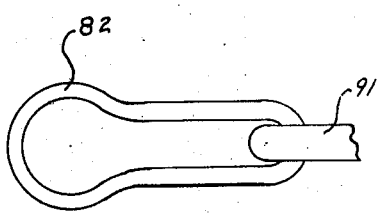
FIG. 7               FIG. 6
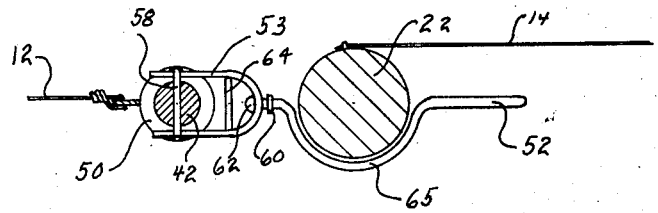
FIG. 8
*INVENTOR.*
JAMES M. CISNEY
BY *M. A. Hobbs*
ATTORNEY

United States Patent Office 2,859,944
Patented Nov. 11, 1958

2,859,944

WIRE TENSIONING AND LOCKING DEVICE

James M. Cisney, Walkerton, Ind.

Application July 2, 1956, Serial No. 595,189

3 Claims. (Cl. 256—37)

The present invention relates to a wire tensioning and locking device.

One of the principal objects of the present invention is to provide a device for stringing a wire or a series of wires into the approximate location desired, placing tension on the wire and locking the wire in place under the desired tension.

Another object of the invention is to provide a device for placing tension on and locking in place a section of wire, which is so constructed and arranged that it can readily be moved into and out of its tensioning and locking positions and the section of wire placed into and removed from its strung position.

Another object of the invention is to provide an easily portable device for use in positioning a section of wire fence and for thereafter placing tension on and locking in place the section so that it forms an integral part of the complete fence.

Still another object is to provide a fence tensioning and locking device which can easily be carried from one location to another and readily installed in the various locations without the use of any tools or equipment.

A further object of the invention is to provide a sturdy trouble-free fence support and lock which can be operated under adverse weather conditions without interference from snow and ice and which can not be manipulated to its unlocked position by farm animals.

Further objects and advantages will become apparent from the following description and accompanying drawings wherein two embodiments of my invention are illustrated. In the drawings:

Figure 4 is a horizontal cross-sectional view of my device taken on line 4—4 of Figure 2;

Figure 5 is a horizontal cross-sectional view of the device taken on line 5—5 of Figure 2;

Figure 6 is an enlarged top plan view of an element of my wire tensioning and locking device;

Figure 7 is an enlarged top plan view of a modified form of the element shown in Figure 6;

Figure 8 is a partial cross-sectional view of my device taken on line 8—8 of Figure 3.

Figure 1:
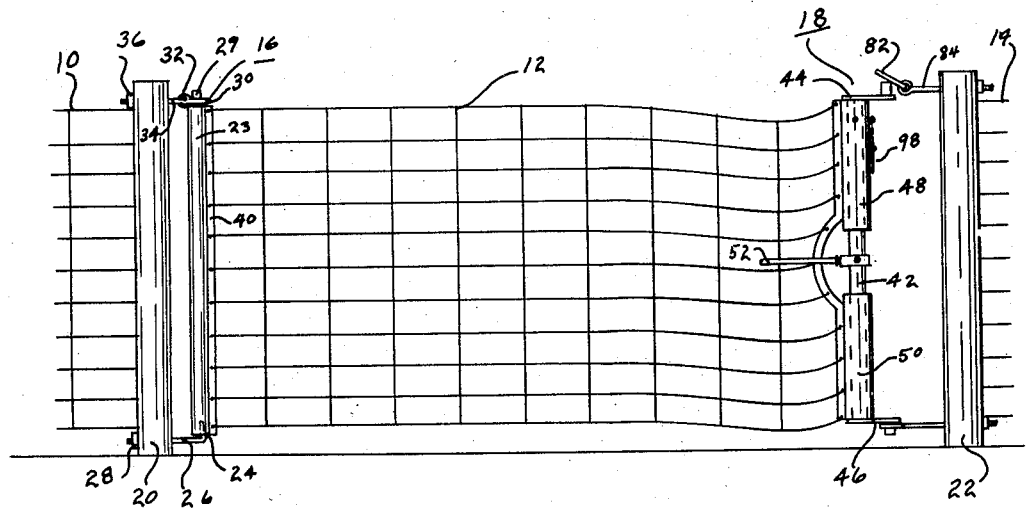
Figure 1 is a plan view of a section of fence showing my tensioning and locking device in its unlocked position.

Referring more specifically to the drawings and to the embodiment of my invention illustrated in Figures 1 through 8, numerals 10, 12 and 14 designate sections of a conventional wire fence extensively used on farms for live stock, numeral 16 designates one unit of my wire tensioning and locking device and numeral 18 another unit of said device. The ends of fence sections 10 and 14 shown are stapled or otherwise joined to conventional round wood fence posts 20 and 22 which form anchors for my two units 16 and 18.

Unit 16 consists of a hollow metal tubing 23 having a plate 24 across the bottom in which is provided a relatively small hole for receiving an upturned end of a rod shaped fixture 26, the latter being threaded and extending through a hole in post 20 where it is firmly held by nut 28. Tubing 23 has a reduced portion 29 at its upper end for receiving a ring 30 of fixture 32 and is held in place on the upturned end of fixture 26 so long as the ring is around the reduced portion. Ring 30 is pivotally connected by an eye to a rod 34 which is threaded and inserted through a hole in the upper end of post 20 and held therein by a nut 36. When unit 16 is to be removed, ring 30 is first lifted from reduced end 29 and tubing 23 is lifted from the upturned end of fixture 26. The left hand end of fence section 12 is secured to tubing 23 by a vertical bar 40 welded or otherwise joined to the tubing and having a number of spaced holes for receiving the ends of the strands of the wire comprising the fence section.

Unit 18 consists of a vertical shaft 42 having bell crank members 44 and 46 joined integrally to the top and bottom ends respectively and extending radially from said shaft in the same direction. Shaft 42 is journalled throughout most of the top half in a sleeve 48 and throughout most of the bottom half in a sleeve 50 and is adapted to rotate freely in said sleeves and move bell crank members 44 and 46 between the positions shown in Figures 2 and 3, said shaft being rotated between the two positions by an arm 52 joined to the shaft between the two sleeves. Arm 52 is attached to the shaft by a bracket 53 consisting of a U-shaped member, the free ends of which are placed on either side of the shaft and held in place by a bolt 58 extending through the two ends and the center of the shaft. The end of arm 52 is inserted in a hole in the curved portion of the U-shaped member and is rotatably held therein by a collar 60 and a head portion 62. The U-shaped member may be reinforced by a bar 64 extending between the two sides. The arm is curved at numeral 65 in order to permit the inner end thereof to move in between shaft 42 and post 22 and thereby become substantially aligned with the fence and the line of force on the unit when it is in its locked position. By having arm 52 rotatably mounted in the U-shaped member it can be rotated from a quarter to a half turn to place the curved portion 65 away from the fence when the unit is unlocked and the arm is in the poistion shown in Figure 2. The right hand end of fence section 12, as viewed in Figure 1, is secured to sleeves 48 and 50 by a vertical bar 66 welded or otherwise joined to the sleeves and having a number of holes for receiving the ends of the strands of the wire fence section. The bar is provided with a curved portion near the center to allow sufficient space for arm 52 and member 53 to be fully manipulated between the unlocked position shown in Figure 2 and the locked position shown in Figure 3.

The short stem 70 of bell crank member 46 is adapted to slip into an eye 71 in the end of a rigid fixture 72 and form the axis about which shaft 42 rotates as unit 18 is moved to and from its locked position, the eye being held rigidly on the end of fixture 72 which in turn is held firmly in post 22 by a nut 74 threaded on the opposite end of the rod-like fixture. Stem 70 fits rather loosely in eye 71 and can readily be removed therefrom by merely lifting unit 18. The short stem 80 of bell crank member 44 is adapted to receive a ring or link 82 and to rotate freely therein as the unit is moved to and from its locked position, said link being pivoted to and forming a part of a fixture 84 which in turn is secured to the upper end of post 22 by a nut 86 threaded onto the end of the rod-like portion of the fixture. The details of one form of link 82 are shown in Figure 6 and of another form in Figure 7, the latter form having a race of ball or roller bearings 90 around the inside half of the hole along the side normally contacting stem 80 to minimize the friction between the stem and link and thereby reduce the force required to lock and unlock unit 18. Both Figures 6 and 7 show the freely pivoted construction of the link in the eye 91 of fixture 84.

Figure 2:
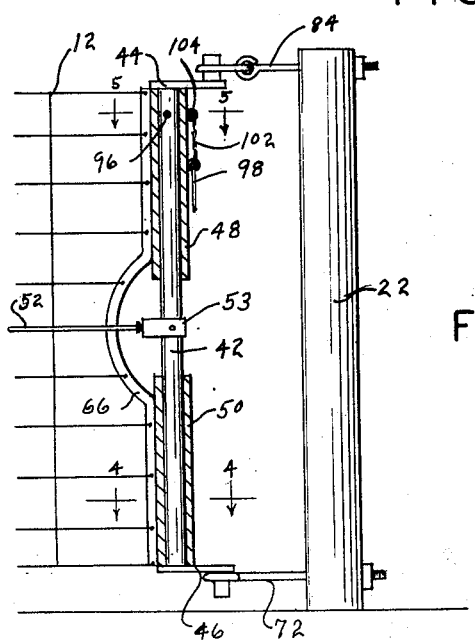
Figure 2 is a partial cross-sectional view of my tensioning and locking device in its unlocked position but in place ready to be locked.
Figure 3:
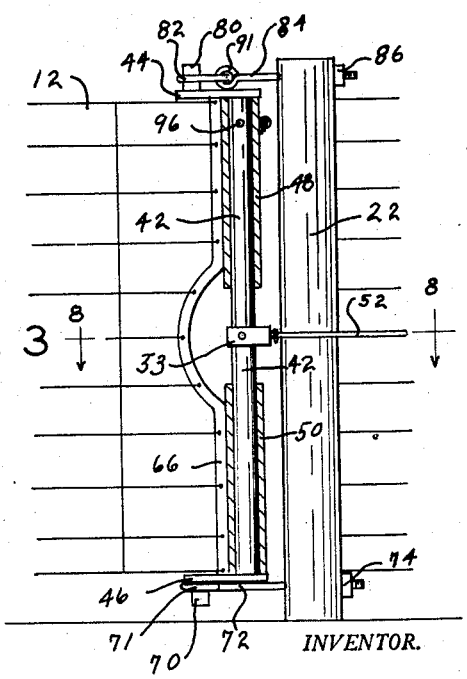
Figure 3 is a partial cross-section view similar to that shown in Figure 2 showing the device in its locked position.

When unit 18 is in its locked position as shown in Figures 3 and 8 with curved portion 65 of arm 52 against post 22, the line of force applied to bell crank members 44 and 46 by the tension on fence section 12 is on dead center or preferably slightly beyond dead center away from arm 52. This tends to rotate shaft 42 in the direction to pull arm 52 firmly against post 22; hence there is no tendency for the unit to become accidentally unlocked and it will stay locked unless some external force starts arm 52 toward its unlocked position. However, in order to prevent any possibility of the unit's being moved to its unlocked position by animals, a latch is included consisting of a hole 96 through sleeve 48 and shaft 42 and a pin 98 for seating in the hole for preventing rotation of the shaft in the sleeves and thereby preventing the unit from moving from the position shown in Figure 3 to that shown in Figure 2 until the pin has been removed from the hole. A hole 100 is also provided in the end of pin 98 for a padlock which when placed through the hole prevents removal of the pin and unlocking of the unit. Pin 98 is shown attached to sleeve 48 by a chain 102 and an eye bolt 104.

It is readily seen that units 16 and 18 can be installed in a fence at any place between any two posts by merely cutting out the section of wire and attaching the ends thereof to bars 40 and 66 and mounting fixtures 26, 32, 72 and 84 to their respective posts. This is a relatively simple operation and can be accomplished without the use of any special tools or equipment. After the parts of units 16 and 18 have been properly assembled on the ends of fence section 12 and the posts, as described, the section is mounted in place by inserting the upturned end of fixture 26 in the hole in plate 24, placing ring 30 over reduced portion 29, placing stem 70 in eye 71 and link 82 over stem 80, while unit 18 is in its unlocked position as shown in Figures 1 and 2, and then rotating arm 52 from the position shown in Figure 2 to the position shown in Figure 3. If desired, pin 98 can then be inserted into hole 96. Since the section of wire fence together with units 16 and 18 is normally relatively light it can be moved from one location to another and installed in a minimum amount of time. If section 12 of the fence is cut to the proper length, a great amount of tension can be applied to said section and the fence sections 10 and 14 when unit 18 is moved from the unlocked position to its locked position, thus giving substantial support not only to those particular sections but also to substantial portions of the fence on either side of those sections.

While only one embodiment of my invention is disclosed herein, other embodiments are possible, as well as various modifications and changes in the embodiment shown, without departing from the scope of the present invention.

I claim:

1. A wire fence insert, comprising a section of wire fencing, a pair of fixtures adapted to be mounted in spaced relation on a support and having aligned holes forming bearing openings therein, one of said fixtures having a pivoted section carrying its bearing opening, stems adapted to seat in said bearing openings, a shaft, off-set means connecting the shaft to the inner ends of the stems, a pair of elongated spaced sleeves rotatably mounted on said shaft between said means, a rigid means attached to said sleeves for supporting one end of the section of wire fencing, an operating arm connected to said shaft between said sleeves, and means fixedly supporting the other end of said fencing.

2. A wire fence insert, comprising a section of wire fencing, a pair of fixtures adapted to be mounted in spaced relation on a support and having aligned holes forming bearing openings therein, one of said fixtures having a pivoted section carrying its bearing opening, stems adapted to seat in said bearing openings, a shaft, off-set means connecting the shaft to the inner ends of the stems, a pair of elongated spaced sleeves rotatably mounted on said shaft between said means, a rigid means attached to said sleeves for supporting one end of the section of wire fencing, an operating arm connected to said shaft between said sleeves, latching means including a pin for preventing relative rotation between said shaft and sleeves, and means fixedly supporting the other end of said fencing.

3. A wire fence insert, comprising a section of wire fencing, a pair of fixtures adapted to be mounted in spaced relation on a support and having aligned holes forming bearing openings therein, one of said fixtures having a pivoted section carrying its bearing opening, stems adapted to seat in said bearing openings, a shaft, off-set means connecting the shaft to the inner ends of the stems, a pair of elongated spaced sleeves rotatably mounted on said shaft between said means, a rigid means attached to said sleeves for supporting one end of the section of wire fencing, an operating arm connected to said shaft between said sleeves, a rigid bar-like member supporting the other end of said fencing, and spaced fixtures adapted to releasably support said member.

References Cited in the file of this patent

UNITED STATES PATENTS

| 499,279 | Bird | June 13, 1893 |
| 556,214 | Ruttman | Mar. 10, 1896 |
| 2,768,456 | Losli | Oct. 30, 1956 |